Jan. 12, 1954

J. M. PESTARINI 2,666,174

SYNCHRONOUS MOTOR

Filed Feb. 8, 1951

INVENTOR
Joseph M. Pestarini
BY
ATTORNEY

Jan. 12, 1954   J. M. PESTARINI   2,666,174
SYNCHRONOUS MOTOR

Filed Feb. 8, 1951   2 Sheets-Sheet 2

INVENTOR
Joseph M. Pestarini
BY
Philip G. Hilbert
ATTORNEY

Patented Jan. 12, 1954

2,666,174

UNITED STATES PATENT OFFICE 2,666,174

SYNCHRONOUS MOTOR

Joseph M. Pestarini, Staten Island, N. Y.

Application February 8, 1951, Serial No. 209,953

6 Claims. (Cl. 318—172)

This invention relates to synchronous motors.

An object of this invention is to provide an improved synchronous motor including a torque developing element of reduced inertia.

Another object of this invention is to provide an improved motor including a stator and a rotor portion comprising a pair of concentric members, the motor being provided with at least one polyphase winding which is adapted to be energized by a system of polyphase currents such that one of the rotor members rotates at synchronous speed.

A further object of this invention is to provide in combination, a motor including a pair of polyphase windings and an annular member of reduced inertia, and means for supplying each winding with a system of polyphase currents having a fundamental angular frequency with an amplitude which is periodically variable with another fundamental angular frequency.

Still another object of this invention is to provide the combination of an improved polyphase motor and an improved source of polyphase currents for energizing the motor, the motor including a pair of relatively rotatable, concentric rotor members, each member being coupled to a power shaft, one member including conductors arranged in a manner whereby the shaft coupled thereto rotates at synchronous speed, the other member including a polyphase winding and arranged whereby the shaft coupled thereto rotates at a synchronous speed.

Still a further object of this invention is to provide a dynamo electric machine which is adapted to operate as a motor or as a power transfer means between a pair of sources of polyphase currents, together with voltage control means for regulating the voltage supplied by at least one of the sources to the machine, thereby determining the ratio of the voltages supplied to the machine by both sources, such ratio determining whether the machine operates as a motor or power transfer means.

Other objects of this invention will in part be obvious and in part hereinafter pointed out.

This application is a continuation in part of application Ser. No. 200,959, filed December 15, 1950, and application Ser. No. 202,524, filed December 23, 1950, now abandoned.

Figure 1:
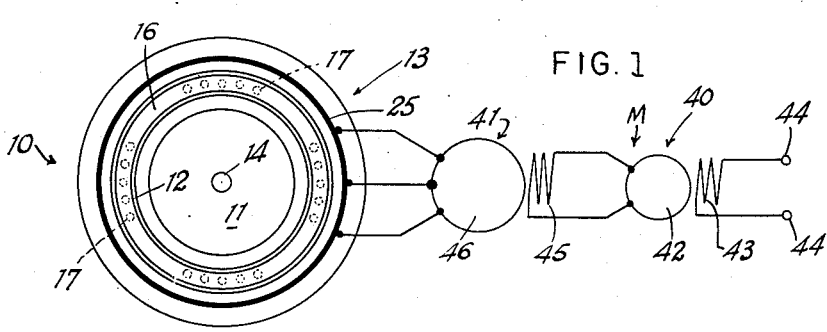
Fig. 1 shows diagrammatically a motor embodying the invention and circuit connections therefor.
Figure 2:
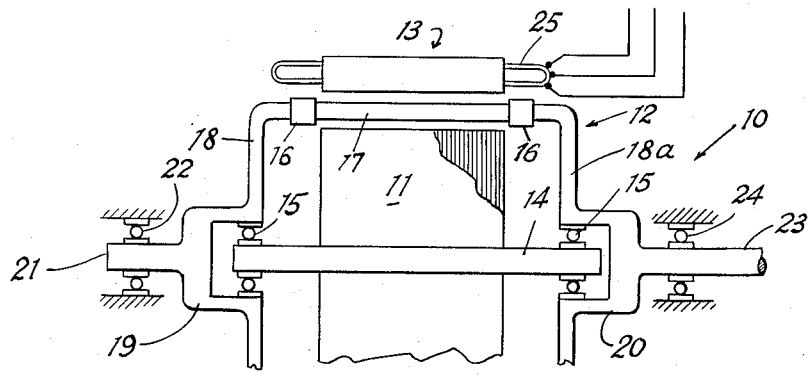
Fig. 2 is a partial side elevational view thereof.

Referring in detail to the drawing and particularly to Figs. 1 and 2, 10 designates a motor embodying the invention. The same comprises essentially a cylindrical rotor element 11 of magnetic material which may be in laminated sheet form, together with a pair of annular members 12, 13 concentrically related to element 11. The rotor element 11 has coupled thereto an axial shaft 14 which is supported for rotation on bearings 15, as shown in Fig. 2.

The annular member 12, which is a second rotor element adapted to develop a torque, is somewhat similar to the peripheral portion of a conventional squirrel cage rotor. Such member comprises a pair of opposed end rings 16 which are interconnected by equiangularly spaced groups of bars or conductors 17 and arranged in a manner described in application Ser. No. 200,959. The end rings 16 have opposed sets of radially extending spider elements 18, 18a, which are respectively interconnected by coaxial, offset and outwardly extending cup portions 19, 20. Such portions provide on their inner surfaces supporting means for bearings 15. A stub shaft 21, supported on bearings 22 extends from portion 19 and a shaft 23 supported on bearings 24 extends from portion 20, the shafts being coaxial.

The member 13, which may be fixed in space, is provided with a polyphase stator winding 25, and for the purpose of illustration, is shown as a three phase winding.

The motor 10 is adapted to be energized with a system of polyphase currents $I_1$, $I_2$, $I_3$, which may be expressed as functions of time as follows:

$$I_1 = A \sin w_0 t \sin w_1 t$$

$$I_2 = A \sin w_0 t \sin \left(w_1 t - \frac{2\pi}{3}\right)$$

$$I_3 = A \sin w_0 t \sin \left(w_1 t - \frac{4\pi}{3}\right)$$

wherein A is a constant, $t$ is a time interval for a complete current cycle and $w_0$ and $w_1$ are angular frequencies referred to below.

Figure 3:
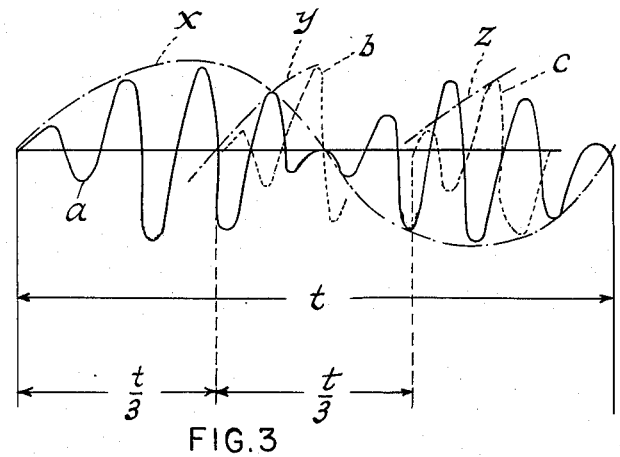
Fig. 3 is a diagrammatic showing of the currents supplied thereto.

Such currents are schematically represented in Fig. 3 where the full line curve $a$ corresponds to current $I_1$ extending over the full time interval $t$.

The dotted line curve $b$ which is displaced relative to curve $a$ by a time interval $$\frac{t}{3}$$

corresponds to current $I_2$ and dotted line curve $c$ which is displaced relative to curve $b$ by a time interval $$\frac{t}{3}$$

corresponds to current $I_3$. The dot and dash curves $x$, $y$ and $z$, in sinusoidal form, represent the envelopes of the respective curves $a$, $b$, $c$.

The currents $I_1$, $I_2$, $I_3$ are provided by a current source generally designated as M. Such source includes a monophase dynamo electric machine 40 in circuit with a polyphase dynamo electric machine 41. The machine 40 includes an armature winding 42 and a field winding 43 which is excited by direct current from a suitable source applied to terminals 44. The machine 41 includes a field winding 45 which is energized by the output of machine 40 and a polyphase armature winding 46, which is shown as three phase, for the purpose of illustration. The output of machine 41 is supplied to the stator winding 25 of motor 10.

Assuming that the machine 40 has an angular frequency of $w_0$ and machine 41 has an angular frequency of $w_1$, then the current source M will provide a system of polyphase currents having one fundamental angular frequency with an amplitude which is periodically variable with another fundamental angular frequency, as represented in the equations set forth above.

Upon energizing the stator winding 25, there will be created a flux $\phi_1$ rotating with an angular speed $$\frac{w_1}{p}$$

and having an amplitude periodically varying with an angular frequency $w_0$, $p$ being equal to the number of pairs of poles of winding 25. The rotor element 12, when it is in step, rotates with an angular speed of $$\frac{w_1}{p}$$

and will create a flux $\phi_2$ which rotates at a speed of $$\frac{w_1}{p}$$

The periodically varying amplitude and the lag of flux $\phi_2$ with respect to flux $\phi_1$, will depend on the load. There will also be created a resultant flux $\phi_{12}$ which rotates at the angular speed of $$\frac{w_1}{p}$$

and of periodically varying amplitude.

Accordingly, as more fully described in application Ser. No. 200,959, the combination of rotor element 12 and the current source M which energizes stator winding 25, will allow the motor 10 to develop a strong torque at synchronous speed. Additionally, as pointed out in application Ser. No. 202,524, the rotor element 11 will have little or no rotation, depending on the hysteresis of the magnetic core. It will be apparent that the torque developing member 12 will have substantially reduced inertia as compared to that of a conventional squirrel cage rotor.

Figure 4:
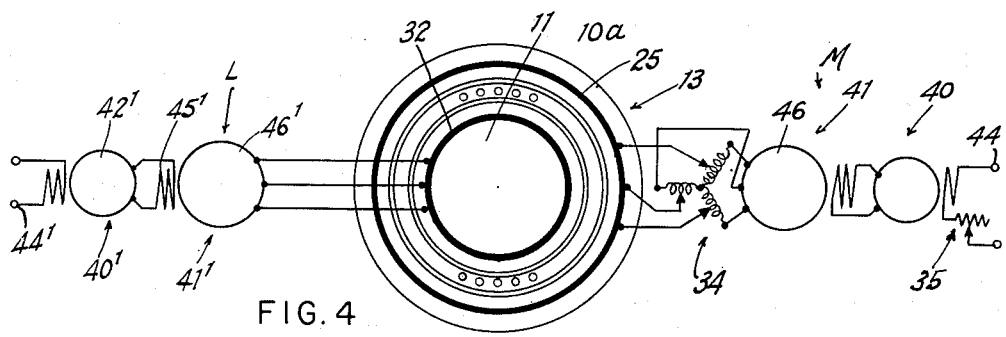
Fig. 4 is a diagrammatic showing of a modified form of the motor and circuit connections therefor.
Figure 5:
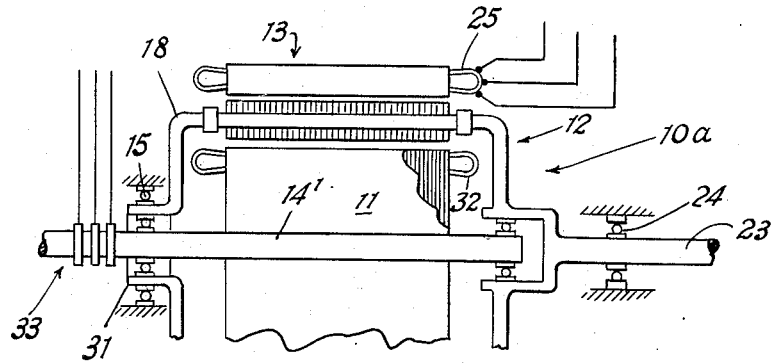
Fig. 5 is a partial side elevational view thereof.

As shown in Fig. 4, the invention may be embodied in a motor 10a, which is similar to that shown in Fig. 1, except that the rotor element 11 is provided with a polyphase winding 32. Additionally, as shown in Fig. 5, the spider elements 18 are connected at their inner ends by a hub 31, through which extends the shaft 14' which is coupled to element 11.

The winding 32 is adapted to be energized by a system of polyphase currents derived from a source generally indicated as L, through slip rings 33. The current source L comprises dynamo electric machines 40' and 41' which correspond to machines 40 and 41, respectively, previously described. The armature winding 42' of machine 40' is connected to the field winding 45' of machine 41' and the field winding 43' of machine 40' is energized by direct current through terminals 44'. The polyphase armature 46' of machine 41' is adapted to be connected to the terminals of winding 32 on motor 10a.

The machine 40' has an angular frequency of $w_0$ which is equal to the frequency of machine 40. Machine 41' has an angular frequency of $w_2$. Accordingly, the winding 32 will be supplied with a system of currents which may be expressed as a function of the time $t$, as follows:

$$I_a = B \sin w_0 t \sin w_2 t$$

$$I_b = B \sin w_0 t \sin \left( w_2 t - \frac{2\pi}{3} \right)$$

$$I_c = B \sin w_0 t \sin \left( w_2 t - \frac{4\pi}{3} \right)$$

wherein B is a constant.

In this case, rotor element 11, upon energization of winding 32, will create a flux $\phi_3$ of periodically varying amplitude which rotates relative to element 11 at an angular speed of $$\frac{w_2}{p}$$

wherein $p$ is equal to the number of poles of winding 32. When element 11 is in step, it rotates with an angular speed N such as to satisfy the equation:

$$N + \frac{w_2}{p} = \frac{w_1}{p}, \text{ or } N = \frac{w_1 - w_2}{p} \qquad (1)$$

When the rotor element 12 does not rotate in step with flux $\phi_1$, the latter induces electromotive forces in element 12 which give rise to a flux $\phi_a$ which rotates with respect to element 12 and develops a torque tending to synchronize element 12 with flux $\phi_1$.

Similarly, when element 12 does not rotate in step with flux $\phi_2$, the latter will induce electromotive forces which will give rise to a flux $\phi_b$ which rotates with respect to element 12 and develops a torque tending to synchronize element 12 with flux $\phi_2$.

Accordingly, the motor 10a is self-starting and will accelerate until rotor element 12 rotates at the angular speed $$\frac{w_1}{p}$$

and rotor element 11 rotates at the angular speed of $$\frac{w_1 - w_2}{p}$$

Once the synchronous condition is reached in the motor, the fluxes $\phi_a$, $\phi_b$, respectively, will lag relative to fluxes $\phi_1$, $\phi_2$, respectively, with an angular lag depending on the load, the lag increasing with an increase in load.

If the value of $w_2$ is less than that of $w_1$, then according to Equation 1, the element 11 will rotate in the same direction as element 12. If $w_2$ is equal to $w_1$, the element 11 will be at a standstill. Finally, if $w_2$ is larger than $w_1$, then element 11 will rotate in a direction opposite to that of element 12.

Accordingly, the shaft 23 coupled to rotor element 12 may supply mechanical power at a predetermined speed and similarly, shaft 14' coupled to rotor element 11 may supply mechanical power at a different speed and in the same or opposite rotational direction, according to the relative values of $w_1$ and $w_2$.

Figure 6:
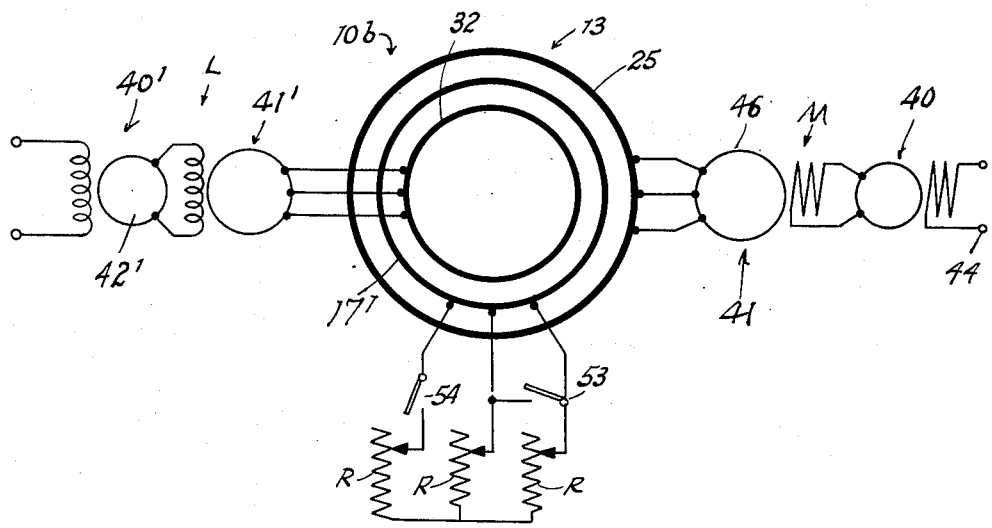
Fig. 6 is a diagrammatic showing of another modification of a motor embodying the invention.

It is understood, that the rotor element 12 of a motor 10b may take the form of a wound rotor and thus include a polyphase winding 17', as shown in Fig. 6. The winding 17' is adapted to be connected through slip rings to starting resistors R inserted in each of the phases of the winding and providing a closed circuit arrangement. A shunt switch 53 and a series switch 54 are also inserted in the winding circuit.

To start the motor 10b, whose windings 25 and 32 are energized from current sources M, L, as previously described, the switch 53 is opened and switch 54 is closed, the resistors R being set at maximum value, thus providing a strong starting torque. The resistor values are then gradually reduced as the motor speed increases. When synchronous speed is reached, the switch 53 is closed and switch 54 is opened, thus rendering all but one phase of winding 17' inoperative. Accordingly, the single operative phase of the winding will have its conductors distributed in successive spaced groups in a manner similar to the distribution of the conductors or bars 17 on the rotor element 12 of motors 10, 10a.

The current sources L, M coact to supply power to motors 10a, 10b. The sum of the power supplied by such sources is equal to the total mechanical power developed by the motor, losses being ignored. The relation of the power supplied by the sources is dependent on the relation of the voltages applied to windings 25, 32. By increasing the voltage applied to winding 32 while maintaining that applied to winding 25, the power supplied by source L will increase in an amount substantially proportional to the square of such voltage. As the power absorbed by the motor remains constant, assuming that the resistant torque is constant, then the power supplied by source M will decrease by the same amount as the power increase of source L.

A progressive increase in the voltage applied to winding 32 will reach a point at which the entire power requirement of the motor will be supplied by source L. When such point is exceeded, the motor will function to transfer power from source L to source M, while continuing to operate as a motor. If $w_2$ is different from $w_1$, the power transferred will be changed in frequency, thus making the motor a frequency changer.

Any suitable means may be used to regulate the voltage applied to winding 32, winding 25 or both windings, in order to obtain the desired ratio of voltages. As shown in Fig. 4, a polyphase autotransformer 34 may be inserted in the connections between winding 25 and the output of machine 41, it being understood that a similar transformer or other suitable voltage regulating devices may be inserted in the circuit of winding 32. Alternatively, voltage regulation may be effected by a resistor in the excitation circuit of machine 40, as indicated at 35.

It is understood that the rotor element 12 may have its bars or conductors 17 embedded in magnetic material as more fully described in application Ser. No. 202,524.

It will thus be seen that there is provided improved synchronous motors in which the several objects of the invention are achieved, and which are well adapted to meet the conditions of practical use.

As various possible embodiments might be made in the above described invention, and as various changes might be made in the embodiments set forth, it is to be understood that all matter herein set forth or shown in the accompanying drawing, is to be interpreted as illustrative and not in a limiting sense.

Having thus described my invention, I claim as new and desire to protect by Letters Patent:

1. In combination, an alternating current motor comprising a plurality of concentric members rotatable relative to each other, at least one of said members including a polyphase winding, another of said members including magnetic material, and a third member located intermediate said first and second mentioned members including a plurality of successively spaced groups of conductors connected in closed circuit, said groups of conductors being equiangularly displaced from one another and being equal in number to the number of poles of said winding, and means for supplying said winding with a system of sequential currents having substantially an intensity equal to the product of a constant, the sine of a first pulsation and the sine of a second pulsation different from the first pulsation, each current differing from a preceding current by an angular lag in one pulsation of said current proportional to the angular displacement of any pair of the successive polyphase windings.

2. The combination as in claim 1, wherein said second mentioned member includes a polyphase winding, and means for supplying said last mentioned winding with a system of sequential currents having substantially an intensity equal to the product of a constant, the sine of said first mentioned pulsation and the sine of a third pulsation different from said second mentioned pulsation, each current differing from a preceding current by an angular lag in one pulsation of said current proportional to the angular displacement of any pair of the successive windings of said last mentioned polyphase winding.

3. In combination, an alternating current motor comprising a stator including a polyphase winding, a rotor element comprising magnetic material rotatably mounted within said stator and a second rotor element comprising an annular member rotatably mounted between said stator and first mentioned rotor element, said second rotor element including a plurality of successively spaced operative groups of conductors connected in a closed circuit, said groups of conductors being equiangularly spaced and being equal in number to the number of poles of said winding and means for supplying said winding with a system of sequential currents having substantially an intensity equal to the product of a constant, the sine of a first pulsation and the sine of a second pulsation different from said first pulsation, each current differing from a preceding current by an angular lag in one pulsation of said current proportional to the angular displacement of any pair of the successive windings in said polyphase winding.

4. In combination, an alternating current motor comprising a stator including a polyphase winding, a rotor element including a polyphase winding and an annular member rotatably mounted between said stator and rotor element, said annular member including a polyphase winding, adjustable resistor means in circuit with each phase of said last mentioned windings and providing closed circuits, and switch means for short circuiting all but one phase of said last mentioned winding whereby the conductors of said one phase are arranged as successive operative groups of conductors connected in close circuit and equiangularly spaced on said annular member and means for supplying at least one of said first and second mentioned windings with a system of sequential currents having substantially an intensity equal to the product of a constant, the sine of a first pulsation and the sine of a second pulsation different from said first pulsation, each current differing from a preceding current by an angular lag in one pulsation of said current proportional to the angular displacement of any pair of the successive windings in said polyphase winding.

5. In combination, an alternating current motor comprising a plurality of concentric members rotatably mounted relative to each other, the outermost member including a polyphase winding, the innermost member including a magnetic core and a polyphase winding, and a third member located between said innermost and outermost members, said third member including a plurality of successively spaced groups of operative conductors connected in a closed circuit, said groups of conductors being equiangularly spaced, means for supplying one of said windings with a system of sequential currents having substantially an intensity equal to the product of a constant, the sine of a first pulsation and the sine of a second pulsation different from the first pulsation, each current differing from a preceding current by an angular lag in one pulsation of said current proportional to the angular displacement of any pair of successive windings of said one polyphase winding and means for regulating the voltage input to said one polyphase winding.

6. In combination, an alternating current motor comprising a stator having a polyphase winding, a rotor element having a polyphase winding, and an annular member rotatably mounted between said stator and rotor element, said annular member including a plurality of successively spaced groups of operative conductors connected in closed circuit, a shaft coupled to said rotor element, a shaft coupled to said annular member, means for supplying said first mentioned polyphase winding with a system of sequential currents having substantially an intensity equal to the product of a constant, the sine of a first pulsation and the sine of a second pulsation different from the first pulsation, each current differing from a preceding current by an angular lag in one pulsation of said current proportional to the angular displacement of any pair of the successive windings in said first mentioned polyphase winding, means for supplying said second mentioned polyphase winding with a system of sequential currents having substantially an intensity equal to the product of a constant, the sign of said first mentioned pulsation and the sine of a third pulsation different from said second mentioned pulsation, each current of said last mentioned current supply means differing from a preceding current by an angular lag in one pulsation of said current proportional to the angular displacement of any pair of the successive windings of said second mentioned polyphase winding, said first mentioned shaft being rotatable at synchronous speed corresponding to said first mentioned pulsation, said second mentioned shaft being rotatable at a synchronous speed corresponding to the difference between said first and third mentioned pulsations.

JOSEPH M. PESTARINI.

References Cited in the file of this patent
UNITED STATES PATENTS

| Number | Name | Date |
|---|---|---|
| 1,491,441 | Thompson | Apr. 22, 1924 |
| 1,526,773 | Clough | Feb. 17, 1925 |
| 2,072,894 | Lilja | Mar. 9, 1937 |
| 2,159,768 | MacMillan | May 23, 1939 |
| 2,338,525 | Mason | Jan. 4, 1944 |
| 2,461,566 | Morrill | Feb. 15, 1949 |